United States Patent
Lai

(10) Patent No.: US 10,333,450 B2
(45) Date of Patent: Jun. 25, 2019

(54) METHOD FOR CONTROLLING OPERATING SPEED AND TORQUE OF ELECTRIC MOTOR

(71) Applicant: THUNDER POWER NEW ENERGY VEHICLE DEVELOPMENT COMPANY LIMITED, Central (HK)

(72) Inventor: Sheng-Fu Lai, Taoyuan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 15/831,129

(22) Filed: Dec. 4, 2017

(65) Prior Publication Data

US 2018/0091082 A1 Mar. 29, 2018

Related U.S. Application Data

(63) Continuation of application No. 14/826,217, filed on Aug. 14, 2015, now Pat. No. 9,866,163.

(Continued)

(51) Int. Cl.
*H02P 23/00* (2016.01)
*H02P 6/08* (2016.01)
(Continued)

(52) U.S. Cl.
CPC .......... *H02P 23/0022* (2013.01); *B60L 11/18* (2013.01); *B60L 15/2045* (2013.01);
(Continued)

(58) Field of Classification Search
CPC .. B60L 11/18; B60L 15/2045; B60L 2240/12; B60L 2240/423; B60L 2260/44; H02P 23/002
See application file for complete search history.

(56) References Cited

U.S. PATENT DOCUMENTS 4,281,276 A 7/1981 Cutler et al.
4,926,105 A 5/1990 Mischenko et al.
(Continued)

FOREIGN PATENT DOCUMENTS

CN 1606230 A 4/2005
CN 101032405 A 9/2007
(Continued)

OTHER PUBLICATIONS

First Office Action for CN Appln No. 201610143780.4 dated Feb. 2, 2018, 24 pages.
(Continued)

*Primary Examiner* — Thai T Dinh
(74) *Attorney, Agent, or Firm* — Kilpatrick Townsend & Stockton LLP

(57) ABSTRACT

Systems and methods for controlling the operating speed and the torque of an electric motor using an operational model are described. An operational model for the electric motor, including a plot of engine performance parameters, is used for reference, and a most efficient output path, which may pass through an optimal operation region in the operational model, is selected. The most efficient output path may be determined, for example, according to locations of a current output state and a to-be-reached target state in the operational model, enabling the operating state of the motor to reach the target state from the current operating state. By selecting a more efficient output path, the operating efficiency of the motor may be optimized, the life of a battery improved and/or the operating mileage of the vehicle may be increased, without significantly reducing the driving experience.

11 Claims, 6 Drawing Sheets

Related U.S. Application Data

(60) Provisional application No. 62/150,848, filed on Apr. 22, 2015, provisional application No. 62/133,991, filed on Mar. 16, 2015.

(51) Int. Cl.

| | | |
|---|---|---|
| *B60L 11/18* | (2006.01) | |
| *B60L 15/20* | (2006.01) | |
| *B60W 10/08* | (2006.01) | |
| *H02P 31/00* | (2006.01) | |
| *H02P 7/285* | (2016.01) | |

(52) U.S. Cl.
CPC ............... *B60W 10/08* (2013.01); *H02P 6/08* (2013.01); *H02P 7/285* (2013.01); *H02P 31/00* (2013.01); *B60L 2240/12* (2013.01); *B60L 2240/421* (2013.01); *B60L 2240/423* (2013.01); *B60L 2260/44* (2013.01); *Y02T 10/645* (2013.01); *Y02T 10/72* (2013.01); *Y02T 10/7283* (2013.01)

(56) References Cited

U.S. PATENT DOCUMENTS

| | | | |
|---|---|---|---|
| 5,289,890 A | 3/1994 | Toyoda et al. | |
| 5,345,155 A | 9/1994 | Masaki et al. | |
| 6,123,163 A | 9/2000 | Otsu et al. | |
| 6,367,570 B1 | 4/2002 | Long, III et al. | |
| 6,766,036 B1 | 7/2004 | Pryor | |
| 6,991,053 B2* | 1/2006 | Kuang | B60K 6/445 |
| | | | 180/65.235 |
| 7,005,819 B2 | 2/2006 | Takai et al. | |
| 7,117,071 B2 | 10/2006 | Aoki et al. | |
| 7,122,979 B2 | 10/2006 | Wilton et al. | |
| 7,289,645 B2 | 10/2007 | Yamamoto et al. | |
| 7,436,139 B2 | 10/2008 | Maslov et al. | |
| 7,739,016 B2 | 6/2010 | Morris | |
| 7,891,450 B2 | 2/2011 | Soliman et al. | |
| 8,013,554 B2 | 9/2011 | West et al. | |
| 8,209,103 B2* | 6/2012 | Oyama | B60K 6/445 |
| | | | 701/101 |
| 8,296,032 B2 | 10/2012 | Wang et al. | |
| 8,625,855 B2 | 1/2014 | El Dokor | |
| 8,892,281 B2 | 11/2014 | Suzuki et al. | |
| 8,924,126 B2* | 12/2014 | Yu | B60K 6/48 |
| | | | 701/102 |
| 9,434,371 B2* | 9/2016 | Muta | B60W 10/06 |
| 9,586,618 B2 | 3/2017 | Sham | |
| 9,755,558 B2 | 9/2017 | Lai | |
| 9,866,163 B2 | 1/2018 | Lai | |
| 9,866,164 B2 | 1/2018 | Lai | |
| 2002/0038173 A1 | 3/2002 | Loffler et al. | |
| 2006/0021811 A1 | 2/2006 | Kuang et al. | |
| 2006/0175995 A1 | 8/2006 | Shinmura et al. | |
| 2007/0077541 A1 | 4/2007 | Champagne et al. | |
| 2008/0067965 A1 | 3/2008 | Bailey et al. | |
| 2009/0063007 A1* | 3/2009 | Masuda | B60W 10/06 |
| | | | 701/102 |
| 2009/0153087 A1 | 6/2009 | Lim et al. | |
| 2009/0259354 A1* | 10/2009 | Krupadanam | B60W 10/06 |
| | | | 701/22 |
| 2009/0278915 A1 | 11/2009 | Kramer et al. | |
| 2010/0152936 A1* | 6/2010 | Wang | B60K 6/445 |
| | | | 701/22 |
| 2011/0128555 A1 | 6/2011 | Rotschild et al. | |
| 2011/0246005 A1 | 10/2011 | King et al. | |
| 2013/0079965 A1* | 3/2013 | Muta | B60W 10/06 |
| | | | 701/22 |
| 2013/0103238 A1* | 4/2013 | Yu | G06F 17/00 |
| | | | 701/22 |
| 2014/0018987 A1 | 1/2014 | Kato et al. | |
| 2014/0081521 A1 | 3/2014 | Frojdh et al. | |
| 2014/0121927 A1 | 5/2014 | Hanita | |
| 2014/0238766 A1 | 8/2014 | Hasuda et al. | |
| 2015/0051775 A1 | 2/2015 | Gotoh et al. | |
| 2015/0072619 A1 | 3/2015 | Abdurrahman et al. | |
| 2015/0317527 A1 | 11/2015 | Graumann et al. | |
| 2016/0272087 A1 | 9/2016 | Lai | |
| 2016/0272242 A1 | 9/2016 | Sham | |
| 2016/0276963 A1 | 9/2016 | Lai | |
| 2016/0355103 A1 | 12/2016 | Lai | |
| 2017/0077855 A1 | 3/2017 | Lai | |
| 2017/0317632 A1 | 11/2017 | Lai | |

FOREIGN PATENT DOCUMENTS

| | | |
|---|---|---|
| CN | 101797880 A | 8/2010 |
| DE | 10 2011 004191 A1 | 8/2012 |
| EP | 0 650 253 A1 | 4/1995 |
| EP | 1 445 855 A2 | 8/2004 |
| JP | H11231958 A | 8/1999 |
| JP | 2007253640 A | 10/2007 |
| JP | 2011121554 A | 6/2011 |

OTHER PUBLICATIONS

U.S. Appl. No. 15/655,165, filed Jul. 20, 2017, Notice of Allowance dated Jan. 8, 2018, all pages.
U.S. Appl. No. 14/826,217, filed Aug. 14, 2015, Non-Final Rejection dated Nov. 22, 2016, all pages.
U.S. Appl. No. 14/826,217, filed Aug. 14, 2015, Notice of Allowance dated Sep. 1, 2017, all pages.
U.S. Appl. No. 14/967,357, filed Dec. 14, 2015, Non-Final Rejection dated Jun. 3, 2016, all pages.
U.S. Appl. No. 14/967,357, filed Dec. 14, 2015, Final Rejection dated Sep. 29, 2016, all pages.
U.S. Appl. No. 15/008,416, filed Jan. 27, 2016, Non-Final Rejection dated Jul. 6, 2016, all pages.
U.S. Appl. No. 15/008,416, filed Jan. 27, 2016, Notice of Allowance dated Oct. 24, 2016, all pages.
U.S. Appl. No. 15/243,061, filed Aug. 22, 2016, Non-Final Rejection dated Mar. 1, 2017, all pages.
U.S. Appl. No. 15/359,367, filed Nov. 22, 2016, Non-Final Rejection dated Aug. 11, 2017, all pages.
First Office Action with a search report dated Aug. 31, 2017 from the China Patent Office for 201610142899, 6 pages.
European Search Report for EP 16 15 9471 dated Sep. 14, 2016, 8 pages.

* cited by examiner

METHOD FOR CONTROLLING OPERATING SPEED AND TORQUE OF ELECTRIC MOTOR

CROSS-REFERENCE TO RELATED APPLICATIONS

The present application is a continuation of U.S. Nonprovisional patent application Ser. No. 14/826,217, filed Aug. 14, 2015, which claims priority to U.S. Provisional Patent Application No. 62/133,991, filed on Mar. 16, 2015, and U.S. Provisional Patent Application No. 62/150,848, filed on Apr. 22, 2015, the disclosures of each of which are hereby incorporated by reference in their entireties for all purposes.

BACKGROUND

The present disclosure relates to control technologies for use with an electric motor, such as in an electric vehicle, and, in some examples, relates to methods for controlling the operating speed and the torque of an electric motor in an operational model for an electric vehicle.

New environmental-friendly and energy-saving electric vehicles involve new fields of technological development, many of which are in need of further improvement in order to continue to expand the market prospects of such vehicles. One area of particular concern involves the limited energy storage of a battery of an electric vehicle. Therefore, reducing energy loss (to increase vehicle mileage) is particularly important, and energy-saving technology for the electric motor is a key factor in this development.

Currently, electric vehicles may be configured to adopt an ECO mode (or a limp-in mode) to reduce power output and power consumption to prolong the vehicle mileage. However, such methods prolong the mileage at the cost of, for example, reducing the power output to decelerate, and reducing the power consumption of electrical components of the vehicle, and can unfavorably limit, or fail to satisfy, driving requirement of the vehicle.

SUMMARY

Exemplary embodiments of the present disclosure may address at least some of the above-noted problems. For example, according to first aspects of the disclosure, a method for controlling the operating speed and torque of an electric motor in an operational model is provided. In embodiments, the operational model may include a plurality of operation positions and an optimal operation region of the electric motor. In embodiments, each operation position may correspond to a speed parameter, a torque parameter and an operating efficiency parameter of the electric motor. Embodiments may include one or more of storing the operational model in a storage device; detecting a current speed parameter and a current torque parameter corresponding to a current operation position of the electric motor in the operational model; inputting a target speed parameter and a target torque parameter corresponding to a target operation position of the electric motor in the operational model; determining whether the current operation position is located in the optimal operation region according to the current speed parameter and the current torque parameter of the electric motor; if the current operation position is not located in the optimal operation region, adjusting the current speed parameter and/or the current torque parameter along a first path to move the current operation position to an intermediate operation position which corresponds to an intermediate speed parameter and an intermediate torque parameter and is located in the optimal operation region; and adjusting the intermediate speed parameter and the intermediate torque parameter to move the intermediate operation position to the target operation position along a second path.

According to further aspects of the disclosure, other methods for controlling the operating speed and torque of an electric motor in an operational model may include one or more of storing the operational model in a storing device; detecting a current speed parameter and a current torque parameter corresponding to the current operation position of the electric motor in the operational model; inputting a target speed parameter and a target torque parameter corresponding to a target operation position of the electric motor in the operational model; determining whether the current operation position is located in the optimal operation region according to the current speed parameter and the current torque parameter of the electric motor; if the current operation position is not located in the optimal operation region, determining whether to select an intermediate operation position in the optimal operation region or directly move the current operation position to the target operation position without selecting an intermediate operation position in the optimal operation region; if there is a need to select the intermediate operation position in the optimal operation region, adjusting at least one of the current speed parameter and the current torque parameter along a first path to move the current operation position to the intermediate operation position which corresponds to an intermediate speed parameter and an intermediate torque parameter and is located in the optimal operation region; and adjusting the intermediate speed parameter and the intermediate torque parameter to move the intermediate operation position to the target operation position along a second path.

According to further aspects of the disclosure, an operational model may be adopted and implemented by systems and methods described herein, providing an efficient output path passing through an optimal operation region in the operational model, when needed, according to the current output state and the to-be-reached target state of a motor, enabling the operating state of the motor to efficiently reach the target state from the current operating state. In some examples, such control systems may provide benefits, such as optimizing the operating efficiency of the motor, improving the life of the drive battery and/or increasing the operating mileage, without significantly reducing the driving experience. Vehicles including engine controllers configured according to the disclosed methods are also included.

Additional features, advantages, and embodiments of the disclosure may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1:
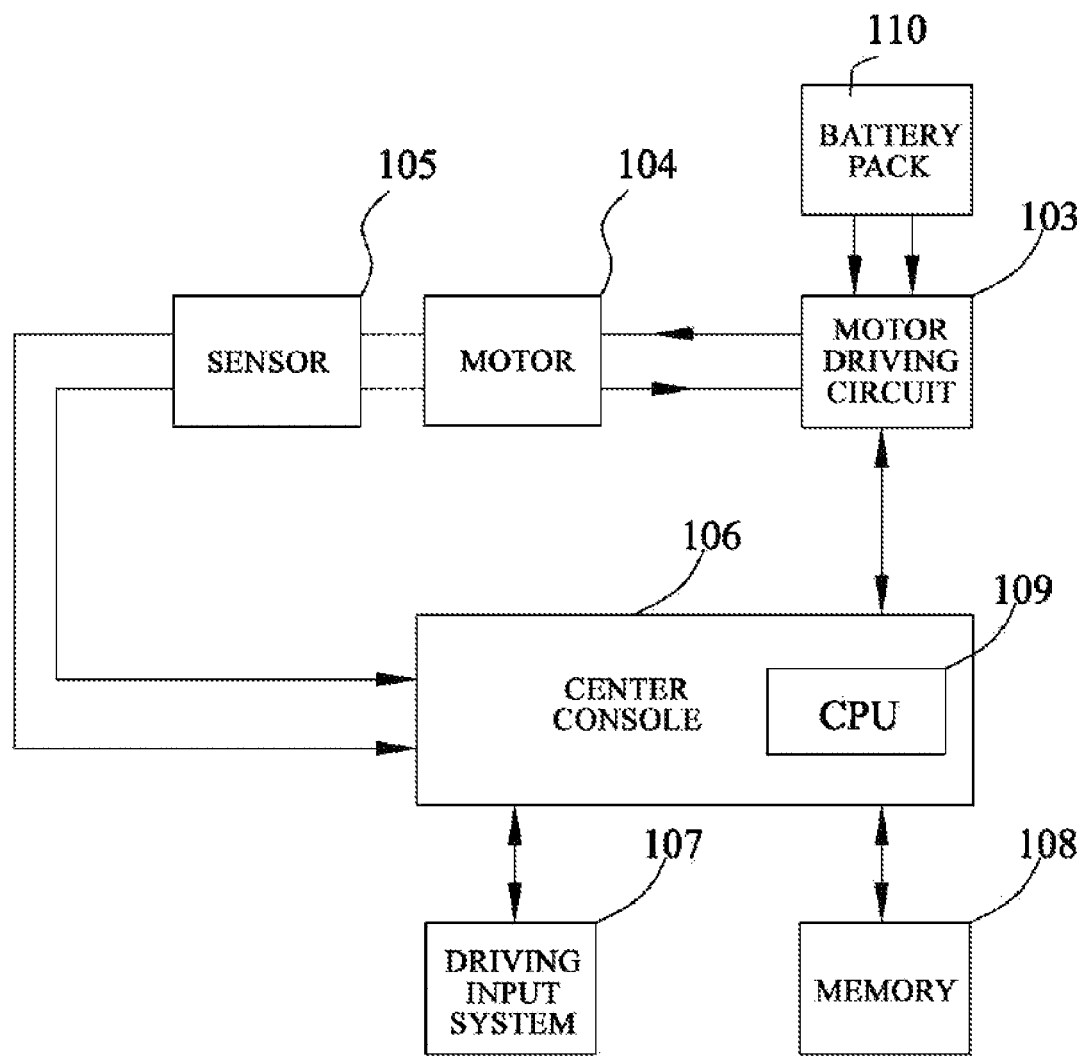
FIG. 1 is a module diagram of an exemplary electric vehicle motor efficiency control system according to aspects of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1 is a module diagram of an exemplary electric vehicle motor efficiency control system according to aspects of the present disclosure. As shown in FIG. 1, a control system for controlling an electric vehicle may include a battery pack 110, a motor driving circuit 103, a motor 104, a sensor 105, a center console 106 (including a CPU 109), a driving input system 107, a memory 108 and the like. The battery pack 110 provides the motor 104 with operating power; the motor driving circuit 103 may be connected between the motor 104 and the battery pack 110 to transmit the power of the battery pack 110 to the motor 104, and the working state of the motor 104 may be controlled by controlling the voltage/current transmitted to the motor 104. The sensor 105 may be used for sensing the current operating parameters (e.g. the speed and the torque) of the motor 104 and sending the operating parameters to the center console 106. According to these parameters, the center console 106 can judge the current operating state of the motor 104 and send a control signal to the motor driving circuit 103 to change the voltage/current input to the motor 104, thus changing the operating state of the motor. The center console 106 may be further connected with the driving input system 107 and the memory 108. The driving input system 107 may be configured to input the target operating state of the motor 104 to the center console 106, the memory 108 may be used to store a motor operational model, and the center console 106 may be configured to read data from and write data into the motor operational model.

The operational model (See, e.g., FIG. 3A to FIG. 3D) may be a motor operating efficiency table obtained by pre-simulating various operating states of the motor 104, and may include a set of multiple operation positions (operating states) of the motor. Each operation position may correspond to a plurality of operating parameters of the motor. For example, the first-dimensional parameter may represent the output torque of the motor (represented by a vertical coordinate), and the second-dimensional parameter may represent the speed of the motor (represented by a transverse coordinate).

In the operational model shown in FIG. 3A to FIG. 3D, each operation position further corresponds to a motor operating efficiency parameter. A motor optimal operation region may be defined in the motor operating efficiency table. For example, the motor optimal operation region consists of the region surrounded by the (innermost) boundary 1 in FIG. 3A to FIG. 3D and the boundary 1. The motor optimal operation region encompasses part of the operation positions, and the operating efficiency values of the motor are relatively high in these operation positions. The present disclosure enables the motor to pass through the motor optimal operation region and then reach the target state so as to consume minimal or less energy when needed. Exemplary control steps are further described with reference to FIG. 2.

Figure 2:
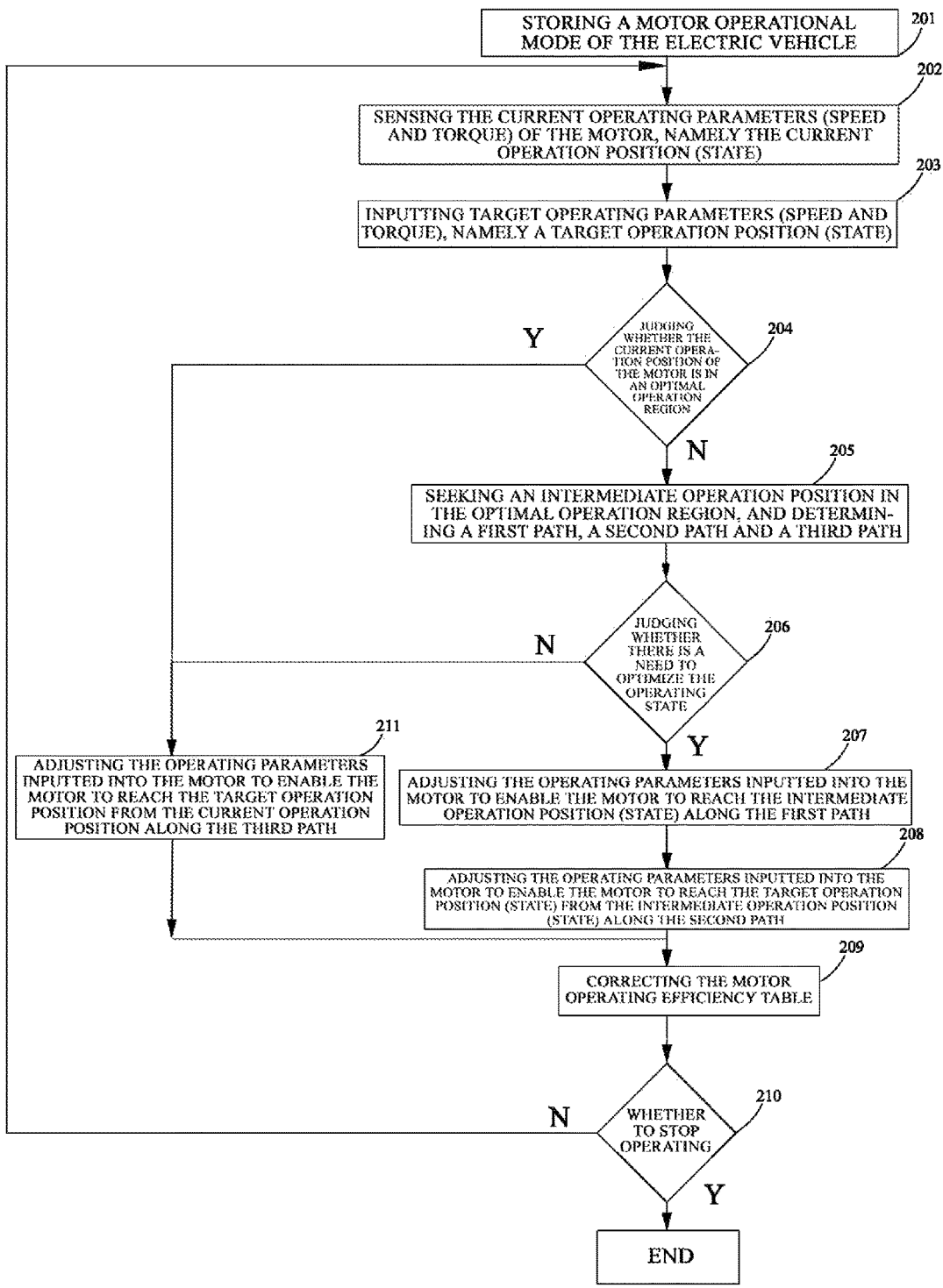
FIG. 2 is a motor efficiency control flow diagram according to aspects of the present disclosure.

FIG. 2 is a motor efficiency control flow diagram of the present disclosure. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

The flow may begin with 201, in which a motor operating efficiency table (operational model) may be pre-stored, e.g. in the memory 108.

The flow may continue with 202, in which a sensor (e.g. 105) senses the current operating parameters of the motor (e.g. 104), including speed and output torque, and sends the current operating parameters to a controller/processor, such as the center console 106. The controller/processor may calculate the position in the motor operating efficiency table that corresponds to the current operating parameters (e.g. using the processor (CPU) 109), so as to obtain the current operation position of the motor on the motor operating efficiency table.

The flow may continue with 203, in which a driving input system (e.g. 107) inputs target operating parameters (speed and torque), and the controller/processor calculates the position in the motor operating efficiency table that corresponds to the target operating parameters, so as to obtain the target operation position of the motor.

The flow may continue with 204, in which the controller/processor may determine whether the current operation position of the motor 104 is in the motor optimal operation region. If not, the flow may continue with 205; or if yes, the flow may continue with 211.

If the flow proceeds to 205, the controller/processor may seek an intermediate operation position in the motor optimal operation region, and determine a first path from the current operation position to the intermediate operation position, a second path from the intermediate operation position to the target operation position and/or a third path from the current operation position to the target operation position. In some examples, the intermediate operation position may be a position on the boundary of the motor optimal operation region which is closest to the current operation position of the motor, the first path may be the shortest path from the current operation position to the intermediate operation position, the second path may be the shortest path from the intermediate operation position to the target operation position, and the third path may be the shortest path from the current operation position to the target operation position.

The flow may proceed from 205 to 206, in which the controller/processor may determine whether there is a need to optimize the operating state of the motor; if yes, the flow may continue with 207; otherwise, the flow may proceed to 211.

In 207, the controller/processor may send an instruction to a motor driving circuit (e.g. 103) to adjust the input voltage and/or current to the motor, so as to enable the operating state of the motor (e.g. 104) to reach the intermediate operation position from the current operation position along the first path determined in 205.

The flow may proceed from 207 to 208, in which the controller/processor may send an instruction to the motor driving circuit to adjust the input voltage/current of the motor, so as to enable the operating state of the motor to reach the target operating position from the intermediate operation position along the second path determined in 205.

Returning to 211, which may follow either of 204 or 206 as described above, the controller/processor may send an instruction to the motor driving circuit to adjust the input voltage/current of the motor, so as to enable the operating state of the motor to reach the target operating position from the current operating position along the third path determined in 205.

Figure 4:
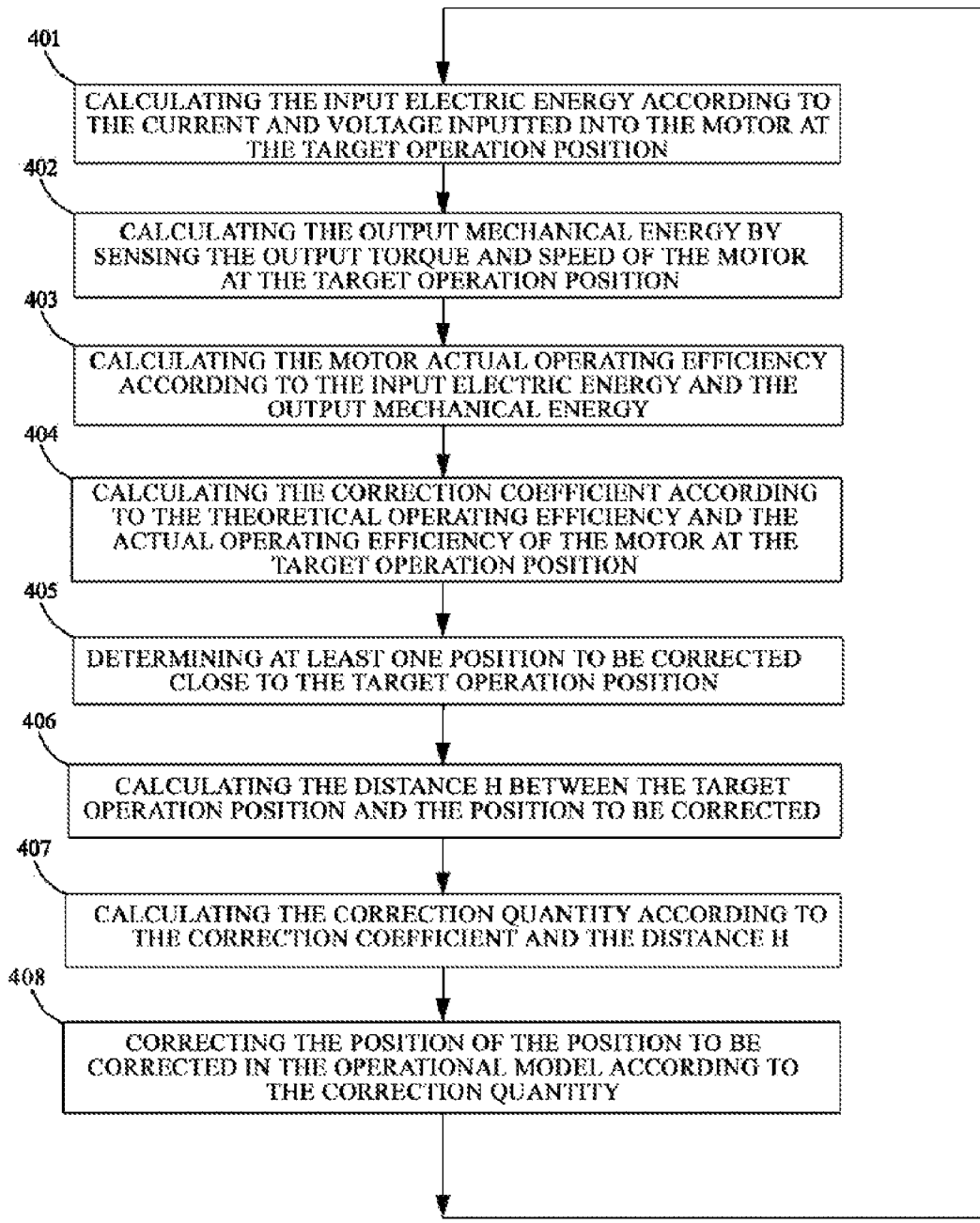
FIG. 4 is a correction flow diagram for an operational model according to aspects of the present disclosure.

After the operating state of the motor is enabled to reach the target operating position in 211 or 208, the flow may continue with 209, in which (according to the actual operating efficiency of the motor) the controller/processor may write data into memory to correct the stored motor operating efficiency table (see also FIG. 4).

The flow may continue with 210, in which the controller/processor may determine whether the motor stops operating; if yes, the control operation may be ended; otherwise, the flow may return to 202.

Further details regarding an exemplary method of determining the intermediate operating position, the first path, the second path and the third path, and how to judge whether there is a need to optimize the operating state of the motor to improve the operating efficiency of the motor, will be described below in conjunction with several examples of the motor operating state in the operational model of the present disclosure as shown in FIG. 3A to FIG. 3D.

Figure 3A:
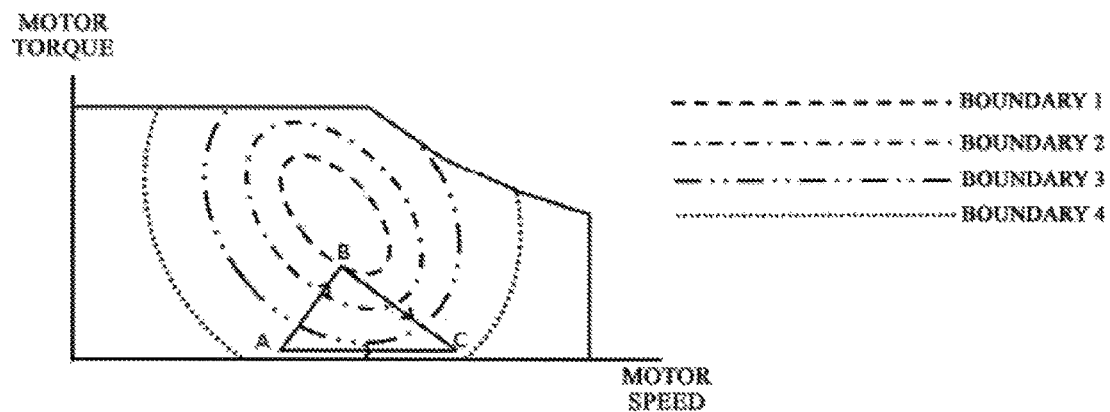
FIG. 3A is a first example of a motor operating state in an operational model according to aspects of the present disclosure.

FIG. 3A is a first example of the motor operating state in the operational model of the present disclosure, wherein, the current operation position of the motor is not within the optimal operation region.

In the motor operational model (motor operating efficiency table) as shown in FIG. 3A, regions circled by boundaries 1, 2, 3 and 4 represent different operating efficiency values, wherein the region in the boundary 1 (including the boundary 1) is defined as the optimal operation region, namely a high-efficiency operating region, the efficiency of which is denoted by $\xi_\alpha$. The efficiency of the region between the boundary 1 and boundary 2 (including the boundary 2) is denoted by $\xi_\beta$, the efficiency of the region between the boundary 2 and boundary 3 (including the boundary 3) is denoted by $\xi_\chi$, the efficiency of the region between the boundary 3 and boundary 4 (including the boundary 4) is denoted by $\xi_o$, and the efficiency of the region beyond the boundary 4 is denoted by $\xi_\tau$. The efficiency has the highest value in the high-efficiency region, and the efficiency values are progressively decreased outwards, namely $\xi_\alpha > \xi_\beta > \xi_\chi > \xi_o > \Omega_\tau$. In FIG. 3A, point A represents the current operation position of the motor, point B represents the intermediate operation position, and point C represents the target operation position.

As described in step 205 of FIG. 2, the intermediate operation position B is the position on the boundary 1 of the motor optimal operation region which is closest to the current operation position A. Specifically, the intermediate operation position B may be calculated by the following method:

1) Supposing there are N points $O_1, O_2 \ldots O_n$ on the boundary 1 of the high-efficiency operating region;
2) Respectively calculating the linear distance between each of the N points $O_1, O_2 \ldots O_n$ and the point A by the following method:

denoting the coordinates of the N points as $O_1(W_1, T_1)$, $O_2(W_2, T_2) \ldots O_n(W_n, T_n)$ respectively, the coordinate of the point A is denoted as $(W_A, T_A)$, wherein W represents the value of speed and T represents the value of torque; denoting the linear distance between each point and the point A as $D_i$ (i=1, 2, 3 ... or n), wherein $D_i$ is calculated in the following way:

$$D_1 = \sqrt{(W_1 - W_A)^2 + (T_1 - T_A)^2};$$

$$D_2 = \sqrt{(W_2 - W_A)^2 + (T_2 - T_A)^2};$$

...

$$D_n = \sqrt{(W_n - W_A)^2 + (T_n - T_A)^2};$$

3, Selecting the point $O_i$ which has the shortest linear distance (namely $D_i$ is the smallest one) from the point A as the point B.

After the point B serving as the intermediate operation position is determined, the first, second and third paths are also determined. The first path is the linear path from the current operation position A to the intermediate operation position B, the second path is the linear path from the intermediate operation position B to the target operation position C, and the third path is the linear path directly from the current operation position A to the target operation position C.

After the intermediate operation position, the first path, the second path and the third path are determined, whether there is a need to optimize the operating state of the motor as described in step 206 can be judged. According to an exemplary method of the present disclosure, if there is a need to optimize the operating state of the motor, the motor firstly reaches the intermediate operation position B from the current operation position A along the first path, and then reaches the target operation position C from the intermediate operation position B along the second path (namely the motor operates along the path ABC). If there is no need to optimize the operating state of the motor, the motor directly reaches the target operation position C from the current operation position A along the third path (namely the motor operates along the path AC). Whether there is a need to optimize the operating state of the motor is determined by comparing the energy consumed when the motor operates along the path ABC with that along the path AC; if the energy consumed along the path ABC is relatively low, then it is determined that there is a need to optimize the operating state of the motor; and if the energy consumed along the path AC is relatively low, then it is determined that there is no need to optimize the operating state of the motor.

A specific judging method is as follows:
1) Defining an operation goal: moving the operating state of the motor from the point A to the point C within an operation time t and reducing the consumption of input electric energy, namely reducing the energy consumption of the motor;
2) Defining the efficiency of the motor as $\xi$: $\xi$ is the value obtained by dividing the output mechanical energy of the motor by the input electric energy of the motor;
3) Defining a sampling time as $t_s$: 1 second per point (the value can be defined otherwise), so each of the path ABC and the path AC together with their end points (points A and C) has t sampling points;

wherein the mechanical energy output of the motor on each sampling point is $E_m$ (kJ)=W (rpm)*T (Nm)*$t_s$ (sec)/9550, W (rpm) represents the speed of the motor, T (Nm) represents the output torque, and 9550 is a conversion constant; the electric energy input of the motor on each sampling point is:

$$E_\theta = E_m(kJ)/\xi;$$

4) Summating the electric energy on each sampling point on each path to obtain the electric energy consumed when the motor operates along the path, and comparing the total electric energy consumption $E_{ABC}$ of the path ABC mode with the total electric energy consumption $E_{AC}$ of the path AC mode:

wherein the electric energy $E_{ABC}$ consumed along the path ABC is:

$$E_{ABC} = \frac{1}{9550}\sum_{i=1}^{t}\frac{W_i * T_i * 1}{\xi_i}$$

the electric energy $E_{AC}$ consumed along the path AC is:

$$E_{AC} = \frac{1}{9550}\sum_{j=1}^{t}\frac{W_j * T_j * 1}{\xi_j}$$

If $E_{ABC} < E_{AC}$, the electric energy $E_{ABC}$ consumed along the path ABC is lower and therefore more economic, so it is determined that the motor operates along the path ABC to optimize the operating state of the motor; otherwise, there is no need to optimize the operating state of the motor, and the motor operates along the path AC.

The above judging method will be exemplarily described below in conjunction with the first example of the motor operating state in the operational model as shown in FIG. 3A.

Specifically, as shown in FIG. 3A, the points A, B and C are triangularly arranged, the distance between A and C is the longest, and AC is the longest side of the triangle. For simplifying the calculation, it is supposed that the operation time is 3 seconds; at the point A, the speed is 1000 rpm, the torque is 100 Nm and the efficiency is 0.6; at the point B, the speed is 1500 rpm, the torque is 120 Nm and the efficiency is 0.9; and at the point C, the speed is 2000 rpm, the torque is 100 Nm and the efficiency is 0.6. For simplicity, the three points A, B and C are taken as sampling points on the path ABC; the point A, the midpoint of AC line and the point C are taken as sampling points on the path AC. Then, the electric energy $E_{ABC}$ consumed when the motor operates along the path ABC is:

$$E_{ABC} = \frac{1}{9550}\left(\frac{100*1000}{0.6} + \frac{120*1500}{0.9} + \frac{100*2000}{0.6}\right) = 73.3 \text{ kJ}$$

the electric energy $E_{AC}$ consumed when the motor operates along the path AC is:

$$E_{AC} = \frac{1}{9550}\left(\frac{100*1000}{0.6} + \frac{100*1500}{0.6} + \frac{100*2000}{0.6}\right) = 78.5 \text{ kJ}$$

Thus, $E_{ABC} < E_{AC}$, the electric energy consumed along the path ABC is lower and therefore more economic, so it is judged accordingly that there is a need to optimize the operating state of the motor, and the motor is controlled to move from the current operation position to the target operation position along the path ABC.

Figure 3B:
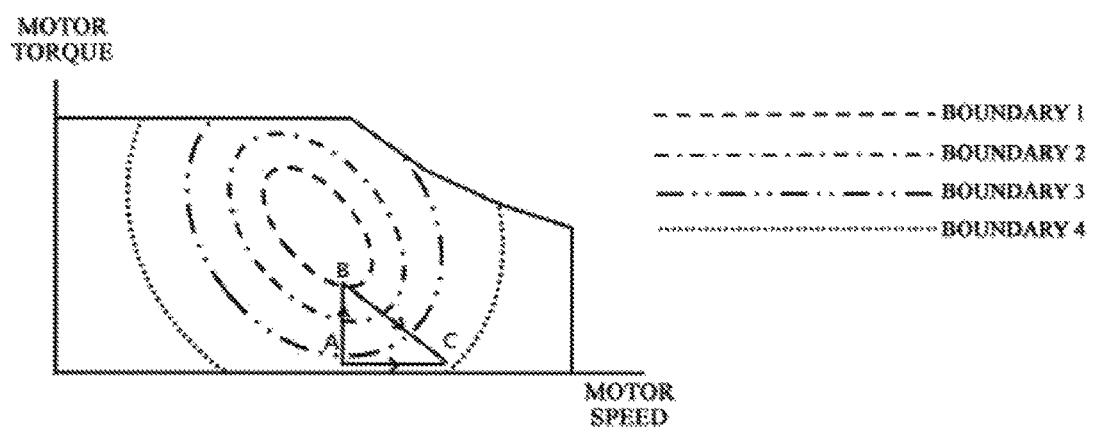
FIG. 3B is a second example of a motor operating state in an operational model according to aspects of the present disclosure.

FIG. 3B is a second example of the motor operating state in an operational model of the present disclosure, wherein the current operation position of the motor is not in the optimal operation region. The above judging method will be exemplarily described in conjunction with the example shown in FIG. 3B.

As shown in FIG. 3B, the points A, B and C are triangularly arranged, AC and AB are equal in distance, and the distance between B and C is the longest. For simplifying the calculation, it is supposed that the operation time is 3 seconds; at the point A, the speed is 1000 rpm, the torque is 100 Nm and the efficiency is 0.6; at the point B, the speed is 1000 rpm, the torque is 120 Nm and the efficiency is 0.9; and at the point C, the speed is 2000 rpm, the torque is 100 Nm and the efficiency is 0.6. For simplicity, the three points A, B and C are taken as sampling points along the path ABC; the point A, the midpoint of AC line and the point C are taken as sampling points along the path AC. Then, the electric energy $E_{ABC}$ consumed when the motor operates along the path ABC is:

$$E_{ABC} = \frac{1}{9550}\left(\frac{100*1000}{0.6} + \frac{120*1000}{0.9} + \frac{100*2000}{0.6}\right) = 66.3 \text{ kJ}$$

the electric energy $E_{AC}$ consumed when the motor operates along the path AC is:

$$E_{AC} = \frac{1}{9550}\left(\frac{100*1000}{0.6} + \frac{100*1500}{0.6} + \frac{100*2000}{0.6}\right) = 78.5 \text{ kJ}$$

Thus, $E_{ABC}<E_{AC}$, the electric energy consumed along the path ABC is lower and therefore more economic, so it is judged accordingly that here is a need to optimize the operating state of the motor, and the motor is controlled to move from the current operation position to the target operation position along the path ABC.

Figure 3C:
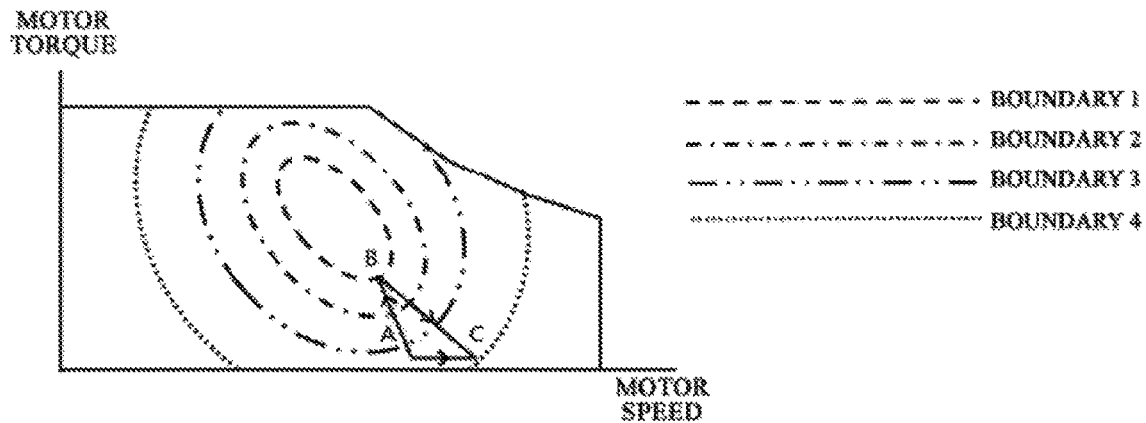
FIG. 3C is a third example of a motor operating state in an operational model according to aspects of the present disclosure.

FIG. 3C is a third example of the motor operating state in an operational model of the present disclosure, wherein the current operation position of the motor is not in the optimal operation region. The above judging method will be exemplarily described in conjunction with the example shown in FIG. 3C.

As shown in FIG. 3C, the points A, B and C are triangularly arranged, the distance between A and C is the shortest, and the distance between B and C is the longest. For simplifying the calculation, it is supposed that the operation time is 3 seconds; at the point A, the speed is 1500 rpm, the torque is 100 Nm and the efficiency is 0.6; at the point B, the speed is 1000 rpm, the torque is 300 Nm and the efficiency is 0.9; and at the point C, the speed is 2000 rpm, the torque is 100 Nm and the efficiency is 0.6. For simplicity, the three points A, B and C are taken as sampling points along the path ABC; the point A, the midpoint of AC line and the point C are taken as sampling points along the path AC. Then, the electric energy $E_{ABC}$ consumed when the motor operates along the path ABC is:

$$E_{ABC} = \frac{1}{9550}\left(\frac{100*1500}{0.6} + \frac{300*1000}{0.9} + \frac{100*2000}{0.6}\right) = 96.0 \text{ kJ}$$

the electric energy $E_{AC}$ consumed when the motor operates along the path AC is:

$$E_{AC} = \frac{1}{9550}\left(\frac{100*1500}{0.6} + \frac{100*1750}{0.6} + \frac{100*2000}{0.6}\right) = 91.6 \text{ kJ}$$

Thus, $E_{ABC}>E_{AC}$, the electric energy consumed along the path AC is lower and therefore more economic, so it is judged accordingly that there is no need to optimize the operating state of the motor, and the motor is controlled to move from the current operation position to the target operation position along the path AC.

In sum, the selection of the path is related with the positions of the three points A, B and C on the motor operating efficiency table and their respective efficiencies. In principle, the path ABC mode is relatively applicable when the torque difference of the two points AB is small and the speed difference of the two points AC is large.

Figure 3D:
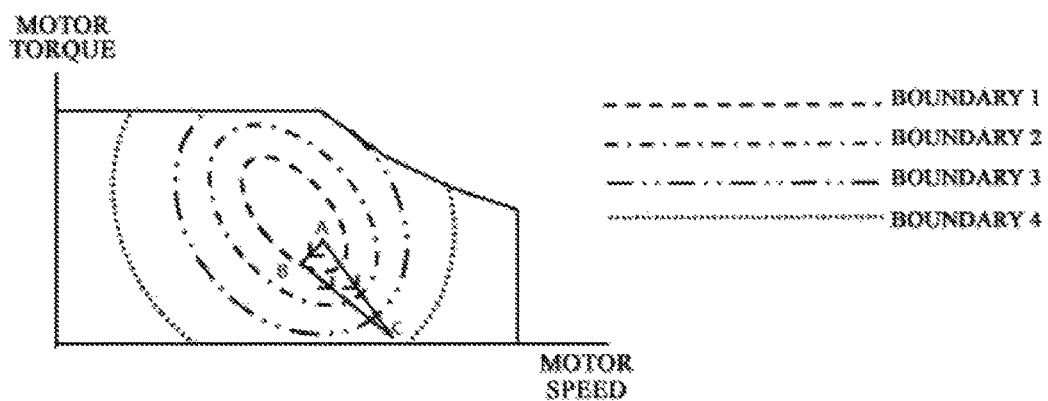
FIG. 3D is a fourth example of a motor operating state in an operational model according to aspects of the present disclosure.

FIG. 3D is a fourth example of the motor operating state in the operational model of the present disclosure, wherein the current operation position of the motor is in the optimal operation region. According to the control flow diagram shown in FIG. 2, when the current operation position of the motor is in the optimal operation region, it is directly judged that there is no need to optimize the operating state of the motor as carried out in FIGS. 3A-3C, and the motor is controlled to move from the current operation position to the target operation position along the path AC. That is to say, when the current operation position of the motor is in the optimal operation region, if an intermediate operation position B is also determined for the motor, the energy consumed by the motor along the path ABC will be greater than that along the path AC. It may be verified by the following calculation.

For simplicity likewise, it is supposed that the operation time is 3 seconds, at the point A, the speed is 1500 rpm, the torque is 400 Nm and the efficiency is 0.9; at the point B, the speed is 1400 rpm, the torque is 350 Nm and the efficiency is 0.9; and at the point C, the speed is 2000 rpm, the torque is 50 Nm and the efficiency is 0.6. For simplicity, the three points A, B and C are taken as sampling points along the path ABC; the point A, the midpoint of AC line and the point C are taken as sampling points along the path AC. Then, the electric energy $E_{AB}c$ consumed when the motor operates along the path ABC is:

$$E_{ABC} = \frac{1}{9550}\left(\frac{400*1500}{0.9} + \frac{350*1400}{0.8} + \frac{50*2000}{0.6}\right) = 144.3 \text{ kJ}$$

the electric energy $E_{AC}$ consumed when the motor operates along the path AC is:

$$E_{AC} = \frac{1}{9550}\left(\frac{400*1500}{0.9} + \frac{225*1750}{0.8} + \frac{50*2000}{0.6}\right) = 138.8 \text{ kJ}$$

Thus, $E_{ABC}>E_{AC}$.

FIG. 4 is a correction flow diagram of an exemplary operational model of the present disclosure. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

In the aforementioned operating mode control method, simulated test data values before the motor and/or vehicle is assembled may be used, and, in actual use of the motor, errors may exist between the actual operating efficiency of the motor and the simulated data. Therefore, it may be advantageous to correct the stored operational model, e.g. in real time. For example, the operational model may be corrected at some interval, or after each time the motor operates to a target position. The data written by the controller/processor into the memory for correcting the stored motor operating efficiency table in step 209 as shown in FIG. 2 may be obtained by a correction flow, such as shown in FIG. 4.

In 401, a controller/processor may calculate the input electric energy of the motor according to the input voltage and current of the motor at the target running position C. The input voltage and current of the motor at the target running position C can be detected, for example, from the driving circuit by a sensor.

The flow may continue with 402, in which the controller/processor may calculate the output mechanical energy from the motor, e.g. according to the torque and the speed detected by sensor(s), of the motor at the target operation position C.

The flow may continue with 403, in which the controller/processor may calculate the motor actual operating efficiency at the target operation position C.

The flow may continue with 404, in which the controller/processor may calculate a correction coefficient according to the operation efficiency corresponding to the target operation position in the operational model (namely the theoretical operating efficiency) and the actual operating efficiency of the motor at the target operation position calculated in 403.

The flow may continue with 405, in which the controller/processor may determine at least one position C' to be corrected close to the target operation position C.

The flow may continue with 406, in which the controller/processor may calculate the distance H between the target operation position C and the position C' to be corrected.

The flow may continue with 407, in which the controller/processor may calculate a correction quantity is calculated according to the correction coefficient calculated in step 404 and the distance H calculated in step 406.

The flow may continue with 403, in which the position of the position C' that is to be corrected in the operational model is corrected according to the correction quantity, and the data is stored to memory.

An exemplary method of correcting the position of the position C' that is to be corrected in the operational model according to the correction quantity in step 407 is as follows:
1) supposing that the target position C is located between the boundary 3 and the boundary 4, wherein the boundary 3 is closer to the high-efficiency region, and the boundary 4 is farther from the high-efficiency region;
2) supposing that the theoretical efficiency of the target position C between the boundary 3 and the boundary 4 is $\xi_t$ and the actually measured efficiency is $\xi_r$, then calculating the correction coefficient $\alpha=(\xi_r-\xi_t)/10\%$;
3) if the correction coefficient is a positive value, selecting a point C' closest to the point C on the boundary 3; if the correction coefficient is a negative value, selecting a point C' closest to the point C on the boundary 4; wherein the distance between the two points C and C' is H;
4) correcting the point C' into a position which is αH far from the point C on the linear path of CC'.

Thus, whenever the motor operates to a target position, the operational model may be corrected once. In this way, during each correction, the position of a point on an efficiency boundary may be changed, the position of the efficiency boundaries in the motor operational model with respect to the transverse coordinate and the vertical coordinate may be changed after multiple times of correction, and such a change can enable the motor operational model to be closer to the actual operating condition of the motor. That is to say, even if the actual operating efficiencies of the motor are changed along with the use of the motor, the motor operational model still can reflect the actual operating conditions of the motor by adopting the correction method of the present disclosure.

Figure 5A:
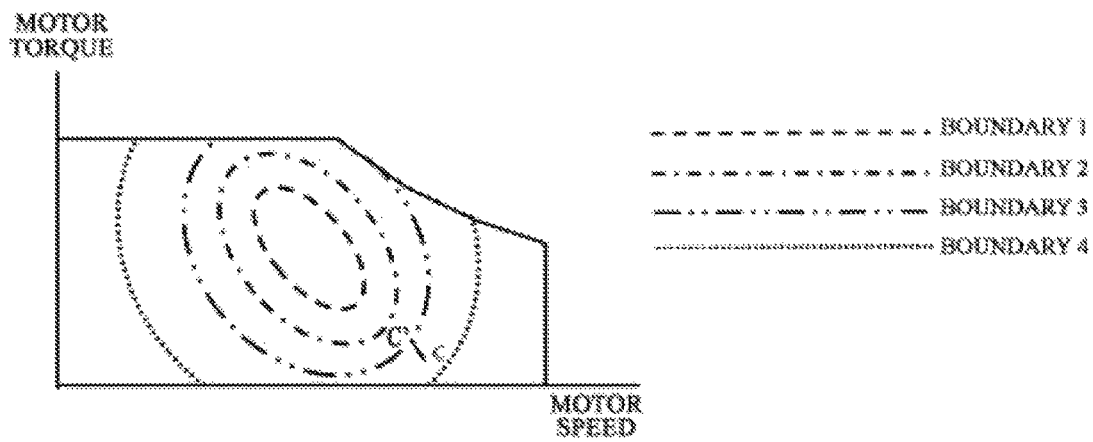
FIG. 5A is an operational model correction diagram according to an embodiment of the present disclosure.
Figure 5B:
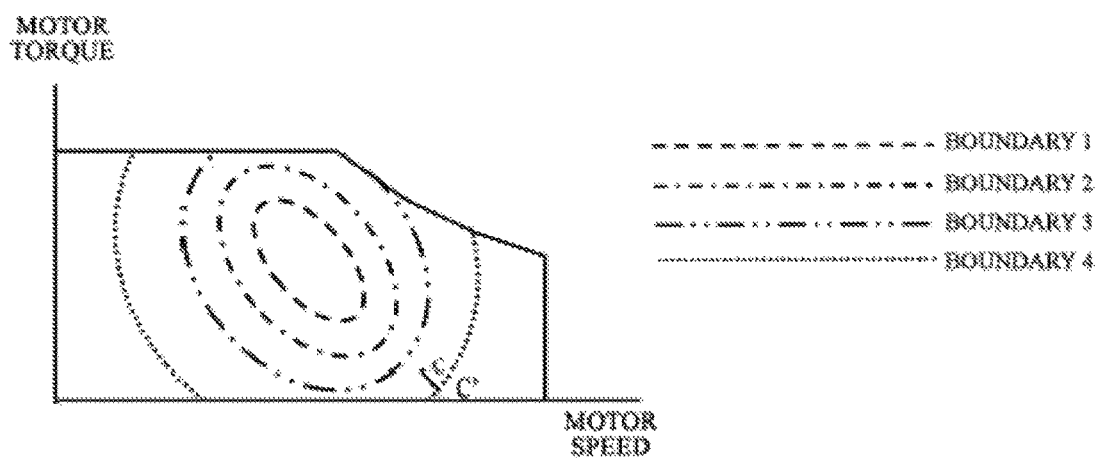
FIG. 5B is an operational model correction diagram according to another embodiment of the present disclosure.

The above-mentioned correction method will be described below in conjunction with two embodiments as shown in FIG. 5A and FIG. 5B.

FIG. 5A is an operational model correction diagram according to an embodiment of the present disclosure. As shown in FIG. 5A, it is supposed that the efficiency within the boundary 1 is 90%, the efficiency between the boundaries 1 and 2 is 80%, the efficiency between the boundaries 2 and 3 is 70%, and the efficiency between the boundaries 3 and 4 is 60%;
1) supposing that the point C is a target position, it is located between the boundaries 3 and 4 and has a theoretical efficiency of 60% and the actually measured efficiency when the motor reaches the point C is 65%, then calculating the correction coefficient α=(actually measured efficiency−theoretical efficiency)/10%=0.5;
2) because the actually measured efficiency is greater than the theoretical efficiency, a point C' on the boundary 3 closest to the point C is selected, and the distance of CC' is H;
3) because the calculated correction coefficient is 0.5, the point C' is corrected into the midpoint of line CC', namely a position which is between C and C' and is 0.5H far from the point C.

FIG. 5B is an operational model correction diagram according to another embodiment of the present disclosure. As shown in FIG. 5B, it is supposed that the efficiency within the boundary 1 is 90%, the efficiency between the boundaries 1 and 2 is 80%, the efficiency between the boundaries 2 and 3 is 70%, and the efficiency between the boundaries 3 and 4 is 60%;
1) supposing that the point C is a target position, it is located between the boundaries 3 and 4 and has a theoretical efficiency of 60%, and the actually measured efficiency when the motor reaches the point C is 55%;
2) because the actually measured efficiency is smaller than the theoretical efficiency, a point C' on the boundary 4 closest to the point C is selected, and the CC' distance is H;
3) the correction coefficient=(actually measured efficiency−theoretical efficiency)/10%=0.5, so the point C' is corrected into the midpoint on line CC', namely a position which is between C and C' and is 0.5H far from the point C.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. A method for controlling the operating speed and torque of an electric motor, wherein the operational model comprises a plurality of operation positions of the electric motor, each operation position indicating at least a value for a speed parameter, a torque parameter and an operating efficiency parameter of the electric motor, the method being implemented by a central processing unit (CPU) configured to execute machine-readable instructions the method comprising:

receiving, from a sensor, by the CPU, a current speed of the electric vehicle corresponding to a current operation position of the electric motor in the operational model;

receiving, from a driving input system, by the CPU, a target speed parameter and a target torque parameter corresponding to a target operation position of the electric motor in the operational model;

determining, by the CPU, whether the current operation position is optimal according to the current speed parameter and the current torque parameter of the electric motor; and if the current operation position is not optimal:
   adjusting at least one of the current speed parameter and the current torque parameter by moving the current operation position to the target operation position along via an intermediate operation position; and
   amending the operation model by revising an efficiency parameter on a selected position in the operational model according to a calculated efficiency parameter on the target operation position.

2. The method of claim 1, further comprising:
selecting, by the CPU, an optimal intermediate operation position in an optimal operation region as the intermediate operation position, wherein the optimal operation region includes one or more of the operation positions.

3. The method of claim 2, wherein:
the optimal intermediate operation position is selected as a position having a shortest linear distance from the optimal operation region to the current operation position in the operational model.

4. The method of claim 1, wherein:
at least one of the current operation position is moved to the intermediate operation position and the intermediate operation position is moved to the target operation position by changing a driving voltage and a driving current applied to the electric motor.

5. The method of claim 1, wherein:
amending the operational model comprises:
   detecting, by the CPU, the input voltage and current of the motor at the target operation position;
   calculating, by the CPU, an actual operating efficiency of the motor at the target operation position according to the torque and the speed of the motor at the target operation position and the detected input voltage and current at the target operation position;
   calculating, by the CPU, a correction coefficient according to the operating efficiency corresponding to the target operation position in the operational model and the calculated actual operation efficiency of the motor at the target operation position;
   selecting, by the CPU, at least one position to be corrected close to the target operation position;
   calculating, by the CPU, the distance between the target operation position and the position to be corrected;
   calculating, by the CPU, a correction quantity according to the calculated correction coefficient calculated and the calculated distance; and
   correcting, by the CPU, the position of the position to be corrected in the operational model according to the correction quantity.

6. A method for controlling an operating speed and the torque of an electric motor in an operational model, wherein the operational model comprises a plurality of operation positions of the electric motor, each operation position indicating at least a value for a speed parameter, a torque parameter and an operating efficiency parameter of the electric motor, the method being implemented by a central processing unit (CPU) configured to execute machine-readable instructions the method comprising:

receiving, from a sensor, by the CPU, a current speed of the electric vehicle corresponding to a current operation position of the electric motor in the operational model;

receiving, from a driving input system, by the CPU, a target speed parameter and a target torque parameter corresponding to a target operation position of the electric motor in the operational model;

determining, by the CPU, whether the current operation position is optimal according to the current speed parameter and the current torque parameter of the electric motor;

if the current operation position is not optimal, determining, by the CPU, whether to select an intermediate operation position or directly move the current operation position to the target operation position without selecting an intermediate operation position in the optimal operation region; and in response to determining the intermediate operation position in the optimal operation region is to be selected:
   adjusting at least one of the current speed parameter and the current torque parameter by moving the current operation position to the target operation position along via an intermediate operation position; and
   amending the operation model by revising an efficiency parameter on a selected position in the operational model according to a calculated efficiency parameter on the target operation position.

7. An electric vehicle comprising:
an electric drive motor;
a battery configured to power the electric drive motor; and
an electric vehicle motor controller including a processor and a memory with an operational model stored therein, the operational model including a predetermined optimal operation region of the electric drive motor, and the processor configured to:
   detect, by a sensor, a current speed the electric vehicle;
   determine a current operation position of the electric drive motor in the operational model based on the current speed of the electric vehicle;

determine, from a driving input system, by the processor, a target speed parameter and a target torque parameter corresponding to a target operation position of the electric motor in the operational model;

determine whether the current operation position is optimal to the current speed parameter and the current torque parameter of the electric motor;

if the current operation position is not optimal, determine whether to select an intermediate operation position or directly move the current operation position to the target operation position without selecting an intermediate operation position in the optimal operation region;

send control signals configured to transition the electric drive motor from the current operation position to the target operation position in the operational model; and amend the operational model by adjusting at least one of the current speed parameter and the current torque parameter by moving the current operation position to the target operation position along via an intermediate operation position.

8. The vehicle of claim 7, wherein the processor is further configured to:

in response to determining the intermediate operation position is to be selected:

adjust at least one of the current speed parameter and the current torque parameter along a first path to move the current operation position to the intermediate operation position which corresponds to an intermediate speed parameter and an intermediate torque parameter and is located in an optimal operation region; and in response to the current speed parameter and the current torque parameter having been adjusted to the intermediate speed parameter and an intermediate torque parameter, further adjust the current speed parameter and the current torque parameter to move the current operation position to the target operation position along a second path.

9. The vehicle of claim 8, wherein the processor is further configured to:

select an optimal intermediate operation position in the optimal operation region as the intermediate operation position, wherein the optimal intermediate operation position is selected as a position having a shortest linear distance from the optimal operation region to the current operation position.

10. The vehicle of claim 7, wherein the control signals are configured to transition the electric drive motor from the current operation position to the target operation position on the operational model by changing at least one of the driving voltage and the driving current applied to the electric motor such that the current operation position at any time during the transition to the target operation position is on a transition path in the operational model.

11. The vehicle of claim 7, wherein:

amending the operational model comprises:

detecting the input voltage and current of the motor at the target operation position;

calculating the actual operating efficiency of the motor at the target operation position according to the torque and the speed of the motor at the target operation position and the detected input voltage and current at the target operation position;

calculating a correction coefficient according to the operating efficiency corresponding to the target operation position in the operational model and the calculated actual operation efficiency of the motor at the target operation position;

selecting at least one position to be corrected close to the target operation position;

calculating the distance between the target operation position and the position to be corrected;

calculating a correction quantity according to the calculated correction coefficient calculated and the calculated distance; and correcting the position of the position to be corrected in the operational model according to the correction quantity.

* * * * *